US008006288B2

(12) United States Patent
Camenisch

(10) Patent No.: US 8,006,288 B2
(45) Date of Patent: Aug. 23, 2011

(54) METHOD AND APPARATUS FOR ACCESSING A COMPUTER APPLICATION PROGRAM

(75) Inventor: Jan L. Camenisch, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 11/265,732

(22) Filed: Nov. 2, 2005

(65) Prior Publication Data

US 2006/0101507 A1 May 11, 2006

(30) Foreign Application Priority Data

Nov. 5, 2004 (EP) .................................... 04026280

(51) Int. Cl.
G06F 7/04 (2006.01)
G06F 15/16 (2006.01)
G06F 17/30 (2006.01)
H04L 29/06 (2006.01)
(52) U.S. Cl. ............................. 726/5; 405/403; 713/182
(58) Field of Classification Search .................. 726/5, 9, 726/18, 19, 20
See application file for complete search history.

(56) References Cited

U.S. PATENT DOCUMENTS

| 4,995,082 | A | 2/1991 | Schnorr | 380/23 |
|---|---|---|---|---|
| 6,510,236 | B1 * | 1/2003 | Crane et al. | 382/116 |
| 6,988,210 | B1 * | 1/2006 | Audebert | 726/9 |
| 7,054,637 | B2 * | 5/2006 | Weigand | 455/445 |
| 7,174,454 | B2 * | 2/2007 | Roskind | 713/155 |
| 7,373,515 | B2 * | 5/2008 | Owen et al. | 713/182 |
| 7,487,537 | B2 * | 2/2009 | Giles et al. | 726/5 |
| 2004/0117665 | A1 * | 6/2004 | Ong | 713/202 |
| 2004/0229595 | A1 * | 11/2004 | Laursen et al. | 455/403 |

OTHER PUBLICATIONS

Schnorr, C.P., "Efficient Signature Generation by Smart Cards," Journal of Cryptology, 1991, 4:161-174.
Brickell et al., "Direct Anonymous Attestation," 11th ACM Conference on Computer and Security, ACM Press, 2004, pp. 225-234.
Schnorr, C.P., "Efficient Identification and Signatures for Smart Cards," Journal of Cryptology, 4(3):239-252, 1991.

* cited by examiner

*Primary Examiner* — Taghi T Arani
*Assistant Examiner* — Mahfuzur Rahman
(74) *Attorney, Agent, or Firm* — Cantor Colburn LLP; Steven Chiu

(57) ABSTRACT

In some embodiments, a request may be generated to register a computing device of a user to a registration issuer, and in response a device related credential for the computing device may be obtained, the device related credential being for exclusive use of that computing device and being related to a unique identifier of the user. A request for a credential for an application program may be generated, and in response an application credential for the application program may be obtained, the application credential being related to the unique identifier of the user. A request for access to the application program may be generated, the request comprising the application credential and the device related credential. In response to the request for access, access to the application may be granted if the device related credential and the application credential relate to the same unique user identifier.

15 Claims, 1 Drawing Sheet

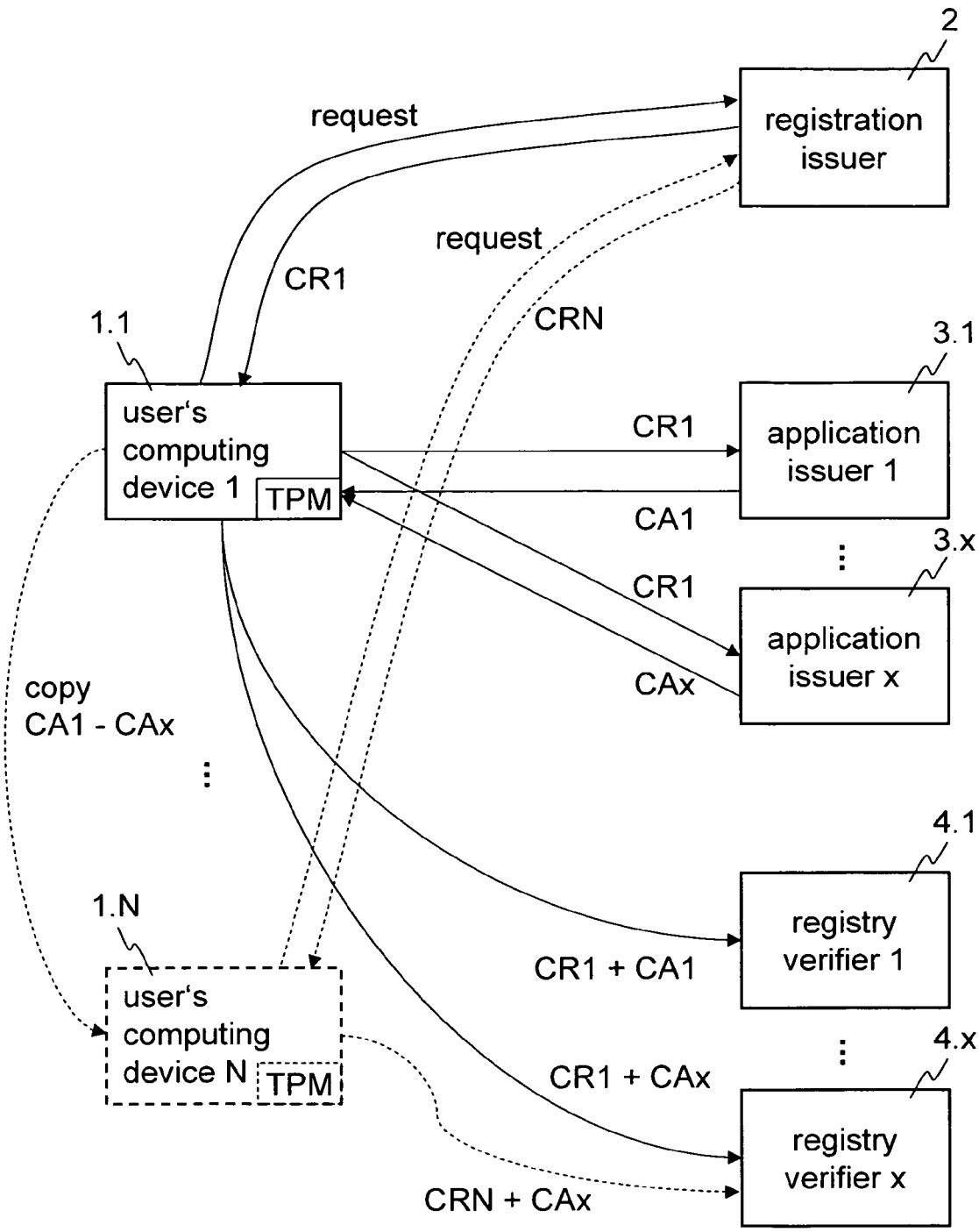

METHOD AND APPARATUS FOR ACCESSING A COMPUTER APPLICATION PROGRAM

TECHNICAL FIELD

The present invention relates to methods and apparatus for obtaining and issuing credentials enabling access to a computer application program, and for requesting and granting access an to application based on the use of credentials.

BACKGROUND OF THE INVENTION

Digital credentials and certificates can easily be shared and copied among different users. For instance, if one user possesses a credential that allows him to access some service or application, he can easily share the credential with his friends and thereby enable his friends to access the service as well. While with a non-anonymous credential, this sharing can to some extend be detected by the fact that some credentials get used too often, such detection is not possible with anonymous credentials. One possible solution to the problem is to use tamper resistant hardware to which a credential is bound such that a credential can only be used in connection with that hardware. This, however, has the drawback in that it does not leave the user any flexibility in using the credential. For example, if the hardware is contained in a personal digital assistant (PDA) or laptop, the user cannot use the credential on all his computing devices but only with the computing device that has this hardware. Thus, the known solutions either do not allow the user to transfer the credential from one computing device to another, or otherwise allow the user to share the credentials with other users.

There are proposals that aim to deter a user from sharing a credential by either making it such that by sharing a credential, the user also shares some other secret (e.g., a secret that gives access to his bank account), or making it such that if the user shares one credential then he shares all his credentials. These methods have limited applicability because the first one assumes that a valuable secret exists and the second assumes that there are other valuable credentials. Both postulates are often not fulfilled.

Hence, it is desired to provide a credential mechanism that allows use of multiple computing devices for requesting access to an application and that discourages unauthorized circulation of a credential.

SUMMARY OF THE INVENTION

According to embodiments of the present invention, each of a user's computing devices is issued a device related credential that is both tied to the corresponding computing device and that includes a unique identifier of the user (which is referred to herein as "$ID_{user}$"). Credentials may also be issued to that user to allow the user access to particular application programs, and these credentials (which are referred to herein as "application credentials") also comprises the same user identifier ($ID_{user}$). The application may be any kind of service, application, information or the like typically provided by an application server computer or a network. Whenever the user wants to use an application credential, that user not only presents the application credential, but is also asked to produce a device related credential, with both credentials required to contain the same user identifier. If the user ensures that he/she registers all his/her computing devices with respect to the same identifier ($ID_{user}$), then he/she can use all his/her application credentials with all his/her computing devices. In addition, if the application credential issuer and/or the device credential issuer make sure that the credentials they issue comprise an identifier unique to each user, then the users cannot share the credentials with anyone. The latter is the case because the device related credentials are tied to the computing devices and hence are not transferable.

Embodiments of the present invention thus may allow use of multiple computing devices for requesting access to an application and simultaneously discourage unwanted or unauthorized circulation of credentials. According to embodiments, circulation of an application credential does not allow a third party to get access from the third party's computing device. According to such embodiments, even if such third party would request access showing the circulated application credential together with a third party's device related credential, the user identifiers included in both credentials would be different, as the device related credential is registered for and includes the third party's user identifier, which in this example would be different than the user identifier of the circulated application credential.

According to a first embodiment of the present invention, there is provided a method for enabling and granting access to an application based on the use of credentials. One or more computing devices of a user may be registered with an issuer computer. That is, a request may be submitted to an issuer computer for registering the requesting computing device. In response to the registration of each computing device, a device related credential designed for exclusive use in connection with the associated computing device and related to a unique identifier of the user may be provided. In addition, an application credential related to the unique identifier of the user may be obtained. Then, an application request comprising an application credential and a device related credential may be submitted to a verifier computer. The verifier computer may verify whether the device related credential and the application credential of the application request as received relate to the same unique identifier, and if they do, may grant access to the application. That is, in the event that the credentials are accepted by the verifier computer, an application associated with the credentials may then be released for the user. This method may reflect the steps a computing device may automatically perform for submitting a request for access to an application, and thus the computing device may comprise a control unit for executing the steps of this method.

According to another embodiment of the present invention, there is provided a method for issuing credentials for enabling access to an application. In response to a request received from a user for registering one or more computing devices, a device related credential may be provided that is designed for exclusive use in connection with the associated computing device and being related to (or designed to be related to) a unique identifier of the user. As this method reflects the steps an issuer computer may automatically perform upon request for issuing credentials, accordingly an issuer computer may comprise a control unit for executing the steps of this method.

According to a further embodiment of the present invention, there is provided a method for granting access to an application based on the use of credentials. An application request may be received comprising an application credential and a device related credential, the device related credential being designed for exclusive use in connection with the requesting computing device and being related to a unique identifier of a user, and the application credential being related to a unique identifier of a user. In response, the method may proceed by verifying whether the device related credential and the application credential relate to the same unique identifier, and in the event they do so granting access to the application. As this method reflects the steps a verifier computer automatically may perform for granting or refusing access to an application upon request, accordingly there may be provided a verifier computer comprising a control unit for executing the steps of this method. The verifier computer may be part of an application server.

According to another embodiment of the present invention, there is provided a method for requesting access to an application based on the use of credentials. An application request comprising an application credential and a device related credential may be submitted to a verifier computer, the device related credential being designed for exclusive use in connection with the requesting computing device and being related to a unique identifier of a user, and the application credential being related to a unique identifier of a user. As this method reflects the steps a computing device may automatically perform for submitting a request for access to an application, accordingly there may be provided a computing device comprising a control unit for executing the steps of this method.

According to embodiments, device related credentials may be obtained by receiving the device related credential from the issuer computer, the device related credential being issued by the issuer computer and being related to the unique identifier of the user. A computing device may obtain the device related credential with a link to the user identifier already included from the issuer computer. Alternatively, the device related credential may be obtained at the computing device by receiving from the issuer computer a device related credential determined to be related to a unique identifier of the user, and by the computing device incorporating the unique identifier of the user into the received device credential. In such embodiment, it is preferred to have the computing device submit proof to the issuer computer for incorporation of a valid unique identifier into the received device related credential. Similarly, application credentials may be obtained by a computing device by submitting a request for an application credential to an application issuer computer. In analogy to the device related credential, in response to the application credential request, the computing device may obtain the application credential by receiving the application credential from the application issuer computer, the application credential being issued by the application issuer computer and related to the unique identifier of the user. Alternatively, the application credential may be obtained by the computing device by receiving from the application issuer computer an application credential determined to be related to the unique identifier, and by incorporating the unique identifier of the user into the received application credential. Again, it is preferred that the computing device submit proof to the application issuer computer for the incorporation of a valid unique identifier into the received application credential. As the application credential is not tied to a use on a particular computing device, a user may also copy an application credential that was received from the application credential issuer to all of his/her computing devices.

The invention and its embodiments will be more fully appreciated by reference to the following detailed description of illustrative embodiments in accordance with the present invention when taken in conjunction with the accompanying drawing.

BRIEF DESCRIPTION OF THE DRAWINGS

FIG. 1 shows a schematic illustration of the components which are involved in the issuing of certificates and the verification of these certificates or credentials according to an embodiment of the invention.

DETAILED DESCRIPTION

FIG. 1 shows an example of components which may be involved in issuing credentials and in verifying these credentials according to some embodiments of the present invention. FIG. 1 shows a plurality of computing devices of a user (1.1 to 1.N), a registration issuer (2), a plurality of application issuers (3.1 to 3.X), and a plurality of registration verifiers (4.1 to 4.X). Of course, in other embodiments it is not necessary that the application issuer computers 3.1-3.x are separate computers, but can also be united in a single computer. The same applies analogously to the verifier computers 4.1-4.x.

According to some embodiments of the invention, registration issuer computer 2 is an authority that is provided to allow a user to register his computing device 1.1. From registration issuer computer 2, the user may obtain a device related credential CR1 that is tied to his computing device 1.1, for example using tamper-resistant hardware such as a trusted platform module (TPM). This device related credential CR1 comprises a unique identifier $ID_{user}$ of the user. In particular, all the device related credentials CR1-CRN issued to the user's different computing devices 1.1-1.N should contain the same unique identifier $ID_{user}$ of the user. Thus, registration issuer computer 2 may identify the user and then insert the corresponding identifier $ID_{user}$ into the device related credentials CR1-CRN. Alternatively, the user himself can insert the identifier $ID_{user}$ into the device related credentials CR1-CRN and then prove to the registration issuer 2 that he inserted a valid identifier $ID_{user}$ (i.e., one that was certified by some certification authority).

First computing device 1.1, which belongs to a certain user, may be equipped with a trusted platform module (TPM), which may also be called a security module. Prior to this computing device 1.1 being used to execute a certain application (e.g., an application called APP1), the computing device 1.1 is first registered by means of a registration request with registration issuer computer 2. Therefore, the user of the computing device 1.1 notifies the registration issuer computer 2 about its identity $ID_{user}$. Hereupon, the registration issuer computer 2 uses the identity of the user $ID_{user}$ and the information it gets from the TPM to generate a device related credential CR1. This device related credential CR1 may be transmitted to the computing device 1.1 and bound to the computing device 1.1 (i.e., the device related credential CR1 cannot be used on any other computing device and is therefore worthless for any other computing device).

Preferably, for making the device related credential designed to be only executable in connection with the computing device it is assigned to, the computing device comprises a security module, and a private/public key cryptography is applied. A public/private key is generated in the security module and the public key is sent to the issuer computer (i.e., the device credential issuer computer). The issuer computer may either store the public key in a list of authenticated keys or actually issue a certificate on the public key (i.e. it signs the public key, for example together with some further information or attributes). When the user then wants to use his/her credentials to access some application, including a service or a resource from the computing device with the security module, the computing device may send the public key and possibly the certificate as at least part of the device related credential to the verifier computer as discussed further below. The verifier computer then may either check whether the public key is in the list of the authorized keys that is made available by the issuer computer to the verifier computer, or verify the validity of the certificate on the public key. Finally, using the private key, the computing device may then identify as owner of the public key and then obtain access to the application requested, provided any further requirements are fulfilled. For the communication as introduced above, a zero-knowledge protocol is described in "Efficient signature generation for smart cards", C. P. Schnorr, Journal of Cryptology, 4(3):239-252, 1991, which is incorporated herein by reference. The secret key is not divulged from the security module and the device related credential cannot be used without involving the security module (i.e. the use of the device related credential is exclusively limited to a use in combination with the security module and thus with the computing device).

If the same user wants to register a further computing device, e.g., the computing device 1.N, which is also assigned to the user, the above mentioned procedure may be repeated for the computing device 1.N. The registration issuer computer 2 again may use the identity of the user $ID_{user}$ and the information it gets from the TPM of the computing device 1.N to generate a device related credential CRN, which is bound to the computing device 1.N. Afterwards, the device related credential CRN may be transmitted to the computing device 1.N.

To obtain a credential for an application APP1, the device related credential CR1 may be transmitted to a so-called application or service issuer computer 3.1. The application issuer computer 3.1 can be for example a service seller. Application issuer computer 3.1 may generate an application credential CA1 having the same user identity $ID_{user}$ as the device related credential CR1 and may transmit the application credential CA1 back to the computing device 1.1. The user now owns an application credential CA1 for the application APP1. To release the application APP1 for use, the computing device 1.1 may transmit its device related credential CR1 and the application credential CA1 to a registry verifier computer 4.1, which may be for example a service provider. If the verifier computer 4.1 recognizes that the device related credential CR1 and the application credential CA1 comprise the same user identity $ID_{user}$, it may release the application APP1 for use. Otherwise the use of the application APP1 may be denied.

If a user wants to obtain an application credential for a further application, for example application APPx, the above mentioned procedure may be repeated. Therefore, the device related credential CR1 may be transmitted to an application issuer computer 3.x. The application issuer computer 3.x may generate an application credential CAx having the same user identity $ID_{user}$ as the device related credential CR1 and transmit it back to the computing device 1.1. The user now owns an application credential CAx for the application APPx. For releasing the application APPx for use, the computing device 1.1 may transmit its device related credential CR1 and the application credential CAx to a registry verifier computer 4.x. If the verifier computer 4.x recognizes that the device credential CR1 and the application credential CAx have the same user identity $ID_{user}$, it may release the application APPx for use. Otherwise the use of the application APPx may be denied.

In the event that the user wants to use an application for which he already owns an application credential, for example the application credential CA1 for application APP1, on a further computing device, for example on the computing device 1.N, he/she may simply copy the application credential CA1 to the computing device 1.N. For using the application APP1, the computing device 1.N may then transmit its device related credential CRN and the application credential CA1 to the registry verifier computer 4.1. If the verifier computer 4.1 recognizes that the device related credential CRN and the application credential CA1 have the same user identity $ID_{user}$, it may release the application APP1 for use. Otherwise the use of the application APP1 may be denied.

The method may be applied to both anonymous and non-anonymous credentials. If anonymous credentials are used, the computing device does not necessarily transmit the credential to the verifying party but might use a method such as zero-knowledge proofs to convince the verifying party of its possession of a credential.

If the user gets some application credential (anonymous or not), the application credential provider or application issuer 3.1/3.x makes sure that the application credential CR1/CRN comprises a unique identifier $ID_{user}$. Again, either the user may provide the unique identifier $ID_{user}$ to the application issuer 3.1/3.x, which then includes it into the application credential CA1/CAx, or the user may include the identifier $ID_{user}$ himself/herself and then prove that he/she has included a valid unique identifier $ID_{user}$ into the application credential CA1/CAx. The latter requires that the user possesses some other credential/certificate on his unique identifier $ID_{user}$. While this may in principle be any credential, one may also use the device related credential CR1/CRN to this end, provided that the registration issuer 2 (authority) who issued the device related credential CR1/CRN is known to include a valid user identifier $ID_{user}$ into the device related credentials CR1-CRN. The issuing of the application credential CA1/CAx may be done by several means, including blind signatures and anonymous credential systems. It is understood that there may be some agreement on how the identifier $ID_{user}$ is encoded into the application and device credentials CA1-CAx and CR1-CRN.

When the user uses or shows the application credential CA1/CAx to the verifier 4.1/4.x, one only needs to require him/her to also show possession of a device related credential CR1/CRN comprising the same unique identifier $ID_{user}$. This may be done in an anonymous way such that the verifier 4.1/4.x does not learn the user's identifier $ID_{user}$ but only is assured that the two credentials CA1/CAx and CR1/CRN comprise the same identifier $ID_{user}$, that the device related credential CR1/CRN is indeed tied to a computing device, and that the credentials CA1/CAx and CR1/CRN were issued by the correct parties. Showing the credentials may of course also be done in a non-anonymous way such that the verifier 4.1/4.x learns all the information.

As already mentioned above, a user may use all his application credentials CA1-CAx with all his computing devices 1.1-1.N provided that he has obtained a device related credential CR1-CRN containing his/her unique identifier $ID_{user}$ for all his computing devices 1.1-1.N. Furthermore, application credentials CA1-CAx cannot be used by other users provided that the authority who has issued device related credentials makes sure that these device related credentials issued to different users contain different identifiers $ID_{user1}$, $ID_{user2}$, etc.

It should be noted that one can use the direct anonymous attestation protocol (DAA) as specified by the Trusted Computing Group in its specification of the trusted platform module v1.2 in order to realize the device related credentials CR1-CRN. That is, one can extend the attestation to include as an attribute a user's identifier $ID_{user}$, so the attestation becomes the device related credential CR that is tied to the TPM. A detailed technical description about the direct anonymous attestation protocol can be found in E. Brickell, J. Camenisch, L. Chen, "Direct Anonymous Attestation," 11$^{th}$ ACM Conference on Computer and Communications Security, Oct. 25-29, 2004, ACM Press, pp. 225-234.

In particular, a method is provided that uses a trusted platform module (TPM) as specified by the Trusted Computing Group in TPM V1.2. Further information about the Trusted Computing Group and the trusted platform module can be found in The Trusted Computing Group, TPM Specification Version 1.2, which is available from http://www.trustedcomputinggroup.org.

Preferably, the registration request comprises the unique identifier of the user. Preferably, the application credential request also comprises the unique identifier of the user. The application credential request can also comprise the device related credential from which the application credential issuer can derive the user identifier. From an application credential issuer's view, it is preferred to issue an application credential related (or designed to be related to) a unique identifier of the requesting user in response to a request for an application credential received from the user. In some embodiments, the device credential issuer computer and the application credential issuer computer can be the same.

According to another embodiment, in response to a request received from a user for registering one or more computing devices, and prior to issuing a device related credential upon such request, the issuer computer verifies if the number of device related credentials issued to this user exceeds a given threshold, and the further device related credential is denied if the threshold has been exceeded. In this way, the number of device related credentials may be limited, which is helpful to make an unwanted circulation of application credentials even less useful.

The device related credential to be used exclusively in connection with the associated computing device may be achieved, for instance, by using a security module that is embedded into the device. Preferably, verification at the verifier computer as to whether the device related credential and the application credential relate to the same unique identifier is performed by means of a zero knowledge proof protocol between the computing device and the verifier computer.

According to another embodiment of the invention, one or more of the received application credentials are copied to one or more of the other computing devices belonging to the user. For using the application credential on a further computing device having a device credential that is also related to the unique identifier of the user, the method for obtaining an application credential for a computing device according to the invention may also comprise the further step of the application credential being copied to the further computing device.

In a further embodiment of the invention, a direct anonymous attestation protocol, as specified by the Trusted Computing Group, is processed between the computing device and the application issuer computer to convince the application issuer computer that the computing device has the device credential. Advantageously, with that protocol the computing device can convince the application issuer computer that it has the device credential without revealing its identifier.

Further, there may be provided computer program elements comprising computer program code for performing steps according to any one of the methods as described above when loaded in a digital processor unit of a control unit. There may also be provided computer program products stored on a computer usable medium, the computer program products comprising computer readable program code for causing a digital processor unit of a control unit to execute the steps of any one of the methods as described above.

The application credential may be used in connection with multiple computing devices of a user. Preferably, for its use the application credential is not assigned to a particular computing device. However, the device related credential is assigned to a particular computing device and can only be used in connection with this computing device. In a preferred embodiment, this can be achieved by the device related credential in connection with a security module of the assigned computing device which security module preferably is a tamper proof security module. In such embodiment, the device related credential is bound to the security module. That is, the device related credential cannot be used without the security module. To accomplish this, preferably, the security module has generated a private/public key pair and the private key thereof is kept secret in the security module. The device related credential may then be implemented as a certificate issued on the public key. When one wants to use the device related credential, one has to show the certificate and prove that one is the entity corresponding to the public key. Since the secret key thereof is held inside the security module, this proof can only be performed in conjunction with the security module.

Whereas the application credential is considered to be a credential for enabling access to an application, the device related credential is also considered to be an additional credential for enabling access to the application, which access is granted only if both an application credential and a device related credential pass the verification process.

Preferably, the user identifier can be related to the respective credential in many different ways, such as included in or attached to the rest of the credential, or embedded in the credential in a hidden and/or coded way, or linked to the credential in some way, etc. The credential could for example comprise only a value that is derived or related to a user's ID.

According to embodiments of the present invention, a method for granting access to an application based on the use of credentials comprises the steps of registering one or more computing devices (1.1-1.N) of a user with an issuer computer (2); in response to the registration obtaining, for each computing device (1.1-1.N) a device related credential (CR1-CRN) designed for exclusive use in connection with the associated computing device (1.1-1.N) and being related to a unique identifier of the user ($ID_{user}$), obtaining an application credential (CA1-CAx) being related to the unique identifier of the user ($ID_{user}$), submitting an application request comprising an application credential (CA1-CAx) and a device related credential (CR1-CRN) to a verifier computer (4.1-4.x), and at the verifier computer (4.1-4.x) verifying whether the device related credential (CR1-CRN) and the application credential (CA1-CAx) of the application request as received relate to the same unique identifier ($ID_{user}$), and in the event they do so granting access to the application.

According to embodiments of the present invention, a method for obtaining credentials enabling access to an application, comprises the steps of submitting a request to an issuer computer (2) for registering the requesting computing device (1.1-1.N); in response to the registration request obtaining a device related credential (CR1-CRN) designed for exclusive use in connection with the requesting computing device (1.1-1.N) and being related to a unique identifier of the user ($ID_{user}$); and obtaining an application credential (CA1-CAx) being related to the unique identifier of the user ($ID_{user}$).

The methods described above may further comprise obtaining the device related credential (CR1-CRN) by receiving the device related credential (CR1-CRN) from the issuer computer (2), the device related credential (CR1-CRN) being issued by the issuer computer (2) and being related to the unique identifier of the user ($ID_{user}$). The methods described above may further comprise obtaining the device related credential (CR1-CRN) by receiving a device related credential determined to be related to a unique identifier ($ID_{user}$) of the user from the issuer computer (2) and by incorporating the unique identifier ($ID_{user}$) of the user into the received device credential. The method described may also further comprise submitting proof for incorporation of a valid unique identifier ($ID_{user}$) into the received device related credential to the issuer computer (2).

The methods described above may further comprise submitting a request for an application credential (CA1-CAx) to an application issuer computer (3.1-3.x). This method may also further comprise, in response to the application credential request, obtaining the application credential (CA1-CAx) by receiving the application credential (CA1-CAx) from the application issuer computer (3.1-3.x), the application credential (CA1-CAx) being issued by the application issuer computer (3.1-3.x) and being related to the unique identifier of the user ($ID_{user}$). This method may also further comprise obtaining the application credential (CA1-CAx) by receiving an application credential determined to be related to the unique identifier ($ID_{user}$) from the application issuer computer (3.1-3.x) and by incorporating the unique identifier ($ID_{user}$) of the user into the received application credential. This method may further comprise submitting proof for incorporation of a valid unique identifier ($ID_{user}$) into the received application credential to the application issuer computer (3.1-3.x).

In methods described above, the registration request may comprise the unique identifier of the user ($ID_{user}$). In methods described above, the application credential request may comprises the unique identifier of the user ($ID_{user}$). In methods described above, the application credential request may comprise the device related credential (CR1-CRN).

According to embodiments of the present invention, a method for issuing credentials for enabling access to an application comprises the steps of, in response to a request received from a user for registering one or more computing devices (1.1-1.N), issuing for each requesting computing device (1.1-1.N) a device related credential (CR1-CRN) designed for exclusive use in connection with the respective requesting computing device (1.1-1.N) and being related or designed to be related to a unique identifier of the user ($ID_{user}$). This method may further comprise, in response to a request for an application credential (CA1-CAx) received from a user, issuing an application credential (CA1-CAx) being related or designed to be related to a unique identifier ($ID_{user}$) of the requesting user. These methods may further comprise, in response to a request received from a user for registering one or more computing devices (1.1-1.N) and prior to issuing a device related credential (CR1-CRN) upon such request, verifying if the number of device related credentials (CR1-CRN) issued to this user exceeds a given threshold, and if it does so denying issuing a further device related credential.

According to embodiments of the present invention, a method for granting access to an application based on the use of credentials comprises the steps of, in response to an application request comprising an application credential (CA1-CAx) and a device related credential (CR1-CRN), the device related credential (CR1-CRN) being designed for exclusive use in connection with the requesting computing device (1.1-1.N) and being related to a unique identifier ($ID_{user}$) of a user, and the application credential (CA1-CAx) being related to a unique identifier of a user ($ID_{user}$): verifying whether the device related credential (CR1-CRN) and the application credential (CA1-CAx) relate to the same unique identifier ($ID_{user}$), and in the event they do so granting access to the application.

In methods described above, verifying whether the device related credential (CR1-CRN) and the application credential (CA1-CAx) relate to the same unique identifier ($ID_{user}$) is performed by means of a zero knowledge proof protocol between the computing device (1.1-1.N) and the verifier computer (4.1-4.x).

According to embodiments of the present invention, a method for requesting access to an application based on the use of credentials comprises the step of submitting an application request comprising an application credential (CA1-CAx) and a device related credential (CR1-CRN) to a verifier computer (4.1-4.N), the device related credential (CR1-CRN) being designed for exclusive use in connection with the requesting computing device (1.1-1.N) and being related to a unique identifier of a user ($ID_{user}$), and the application credential (CA1-CAx) being related to a unique identifier of a user ($ID_{user}$).

A computing device, such as for a verifier computer or an issuer computer, may comprise a control unit for executing steps according to the methods as described above.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system—is able to carry out these methods. Computer program element or computer program in the present context mean any expression, in any language, code or notation, of a set of instructions intended to cause a system having an information processing capability to perform a particular function either directly or after either or both of the following a) conversion to another language, code or notation; b) reproduction in a different material form. Embodiments of the present invention may comprise a computer program element comprising computer program code for performing steps according to the methods as described above when loaded in a digital processor unit of a control unit. Embodiments of the present invention may comprise a computer program product stored on a computer usable medium comprising computer readable program code for causing a digital processor unit of a control unit to execute the steps of the methods as described above.

The following reference signs are used in this application:
CR1 device credential for computing device 1
CRN device credential for computing device N
1.1 computing device 1
1.N computing device N
CA1 application credential for application 1
CAx application credential for application x
2 issuer computer
3.1 application issuer computer 1
3.x application issuer computer x
4.1 verifier computer for application 1
4.x verifier computer for application x Any disclosed embodiment may be combined with one or several of the other embodiments shown and/or described. This is also true for one or more features of the embodiments.

What is claimed is:
1. A method for obtaining access to an application program, comprising the steps of:
obtaining an application credential for an application program for a first computing device, the application credential generated from a first device related credential, the first device related credential being for exclusive use of the first computing device, the application credential being related to the application program and comprising a unique identifier of a user;

obtaining a second device related credential for a second computing device of the user, the second device related credential being for exclusive use of the second computing device, and the second device related credential being related to the unique identifier of the user, the obtaining comprising receiving a device related credential from a registration issuer and incorporating the unique identifier of the user into the received device related credential;

storing the application credential from the first computing device on the second computing device;

submitting proof of validity of the unique identifier of the user that was incorporated into the device related credential;

generating a request for access to the application program, the request comprising the application credential stored on the second computing device and the second device related credential;

and receiving access to the application program in response to determining that the second device related credential and the application credential stored on the second computing device comprise the same unique identifier of the user.

2. The method according to claim 1, wherein obtaining the second device related credential comprises reading the second device related credential from a memory in the second computing device.

3. The method according to claim 1, wherein obtaining the application credential for the application program comprises submitting a request for the application credential to an application issuer computer.

4. The method according to claim 3, wherein obtaining the application credential further comprises receiving the application credential from the application issuer computer, the application credential being issued by the application issuer computer and being related to the unique identifier of the user at the device to be registered.

5. The method according to claim 3, wherein obtaining the application credential further comprises receiving at the first computer device the application credential from the application issuer computer, and incorporating at the first computing device the unique identifier of the user into the received application credential.

6. The method according to claim 5, wherein obtaining the application credential further comprises submitting proof of the validity of the unique identifier of the user that was incorporated into the application credential.

7. The method according to claim 1, wherein the determining that the second device related credential and the application credential stored on the second computing device relate to the same unique identifier of the user is performed by means of a zero knowledge proof protocol.

8. A method for granting access to an application based on the use of credentials, comprising the steps of:

receiving from a first computing device a request for access to an application, the request comprising an application credential and a device related credential, the device related credential being exclusive for use in connection with the first computing device and comprising a unique identifier of the user, and the application credential being related to the application and comprising a unique identifier of the user;

verifying that the device related credential and the application credential relate to the same unique identifier;

granting access to the application on the first computing device based on the verification that the device related credential and the application credential relate to the same unique identifier;

storing the application credential from the first computing device to a second computing device, the second computing device comprising a second device related credential, the second device related credential contained in a memory in the second computing device, and received from a registration issuer and incorporating the unique identifier of the user into the device related credential;

submitting proof of validity of the unique identifier of the user that was incorporated into the device related credential; and granting access to the application to the second computing device in response to determining that the application credential of the first computing device and the second device related credential relate to the same unique identifier.

9. The method according to claim 8, wherein verifying that the device related credential and the application credential relate to the same unique identifier is performed by means of a zero knowledge proof protocol.

10. A computer program product comprising computer executable instructions stored on a non-transitory computer usable medium which when loaded in a computer device of a user is able to carry out the steps of:

obtaining at a first computing device an application credential for an application program, the application credential generated from a first device related credential, the first device related credential being for exclusive use of the first computing device, the application credential being related to the application program and comprising a unique identifier of the user, the obtaining comprising receiving at the computer device of the user an application credential from a application issuer computer, and incorporating the unique identifier of the user into the received application credential at the computer device of the user;

storing the application credential from the computer device on a second computing device;

submitting proof of validity of the unique identifier of the user that was incorporated into the application credential;

generating a request for access to the application program, the request comprising the application credential and a device related credential, the device related credential being for exclusive use of the second computing device and being related to the unique identifier of the user; and providing access to the application to the second computing device, in response to determining that the application credential and the device related credential of the second computing device relate to the same unique identifier of the user.

11. The computer program product according to claim 10, wherein obtaining the application credential for the application program comprises submitting a request for the application credential to an application issuer computer.

12. The computer program product according to claim 11, wherein obtaining the application credential further comprises receiving the application credential from the application issuer computer, the application credential being issued by the application issuer computer and being related to the unique identifier of the user.

13. The computer program product according to claim 10, wherein the determining that the second device related credential and the application credential stored on the second computing device relate to the same unique identifier of the user is performed by means of a zero knowledge proof protocol.

14. The computer program product according to claim 10, wherein obtaining the second device related credential comprises reading the second device related credential from a memory in the second computing device.

15. The computer program product according to claim 10, wherein obtaining the second device related credential comprises receiving a device related credential from a registration issuer and incorporating the unique identifier of the user into the received device related credential.

* * * * *